United States Patent
Chen et al.

(10) Patent No.: US 12,450,090 B2
(45) Date of Patent: Oct. 21, 2025

(54) SCHEDULER INCORPORATING THERMAL AWARENESS

(71) Applicant: Red Hat, Inc., Raleigh, NC (US)

(72) Inventors: Huamin Chen, Westboro, MA (US); Chen Wang, Chappaqua, NY (US)

(73) Assignee: Red Hat, Inc., Raleigh, NC (US)

(*) Notice: Subject to any disclaimer, the term of this patent is extended or adjusted under 35 U.S.C. 154(b) by 522 days.

(21) Appl. No.: 17/749,021

(22) Filed: May 19, 2022

(65) Prior Publication Data
US 2023/0376345 A1    Nov. 23, 2023

(51) Int. Cl.
*G06F 9/48* (2006.01)
*G06F 9/455* (2018.01)
*G06F 11/30* (2006.01)

(52) U.S. Cl.
CPC ........ *G06F 9/4881* (2013.01); *G06F 9/45558* (2013.01); *G06F 11/3058* (2013.01); *G06F 2009/45591* (2013.01)

(58) Field of Classification Search
CPC .............. G06F 9/4881; G06F 9/45558; G06F 11/3058; G06F 2009/45591; G06F 2009/4557; G06F 9/5094; Y02D 10/00
See application file for complete search history.

(56) References Cited

U.S. PATENT DOCUMENTS

| | | | |
|---|---|---|---|
| 7,716,006 B2 | 5/2010 | Coskun et al. | |
| 8,219,994 B2 | 7/2012 | Topaloglu | |
| 9,207,994 B2 | 12/2015 | Seshadri et al. | |
| 9,442,773 B2 | 9/2016 | Sur et al. | |
| 9,753,773 B1 | 9/2017 | Borlick et al. | |
| 11,886,914 B1* | 1/2024 | Ghose | G06F 9/45558 |
| 2004/0128663 A1 | 7/2004 | Rotem | |
| 2011/0138395 A1 | 6/2011 | Wolfe | |
| 2015/0143367 A1* | 5/2015 | Jia | G06F 9/45558 718/1 |
| 2015/0347174 A1* | 12/2015 | Song | G06F 9/45558 718/1 |
| 2021/0034436 A1* | 2/2021 | Tian | G06F 9/45558 |
| 2022/0283856 A1* | 9/2022 | Aurongzeb | G06F 9/5094 |
| 2023/0124020 A1* | 4/2023 | Yun | G06F 9/5088 718/1 |
| 2023/0273807 A1* | 8/2023 | Uppalapati | G06F 1/3206 718/1 |

OTHER PUBLICATIONS

Mhedheb et al., "Load and Thermal-Aware VM Scheduling on the Cloud" Algorithms and Architectures for Parallel Processing. ICA3PP 2013. Lecture Notes in Computer Science, vol. 8285, pp. 101-114 [retrieved from https://link.springer.com/chapter/10.1007/978-3-319-03859-9_8]. (Year: 2013).*

(Continued)

*Primary Examiner* — Brian W Wathen
(74) *Attorney, Agent, or Firm* — Womble Bond Dickinson (US) LLP

(57) ABSTRACT

A software container is obtained for execution on one of a plurality of compute nodes. A processing device schedules the software container on a first compute node of the plurality of compute nodes based on a comparison of a thermal state of the first compute node to a defined threshold.

20 Claims, 5 Drawing Sheets

(56) References Cited

OTHER PUBLICATIONS

Skadron et al., "Control-Theoretic Techniques and Thermal-RC Modeling for Accurate and Localized Dynamic Thermal Management" (Feb. 2002), Proceedings Eighth International Symposium on High Performance Computer Architecture, pp. 1-12 [retrieved from https://ieeexplore.IEEE.org/abstract/document/995695].*

Ayoub et al.: "Temperature Aware Dynamic Workload Scheduling in Multisocket CPU Servers", Sep. 2011, 14 pages.

* cited by examiner

SCHEDULER INCORPORATING THERMAL AWARENESS

TECHNICAL FIELD

Aspects of the present disclosure relate to the scheduling and execution of containerized applications and, more particularly, to scheduling containerized applications with regard to the potential for thermal throttling on compute nodes.

BACKGROUND

A container orchestration engine (such as the Red Hat™ OpenShift™ module) may be a platform for developing and running containerized applications and may allow applications, and the data centers that support them, to expand from just a few machines and applications to thousands of machines that serve millions of clients. Container orchestration engines comprise a control plane and a cluster of worker nodes on which pods may be scheduled. A pod may refer to the most basic (smallest) compute unit that can be defined, deployed, and managed by the control plane (e.g., one or more containers deployed together on a single host). The control plane may include a scheduler that is responsible for determining placement of new pods onto nodes within the cluster. The scheduler may attempt to find a node that is a good fit for the pod based on configured policies and predicates.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the scope of the described embodiments.

DETAILED DESCRIPTION

Figure 1:
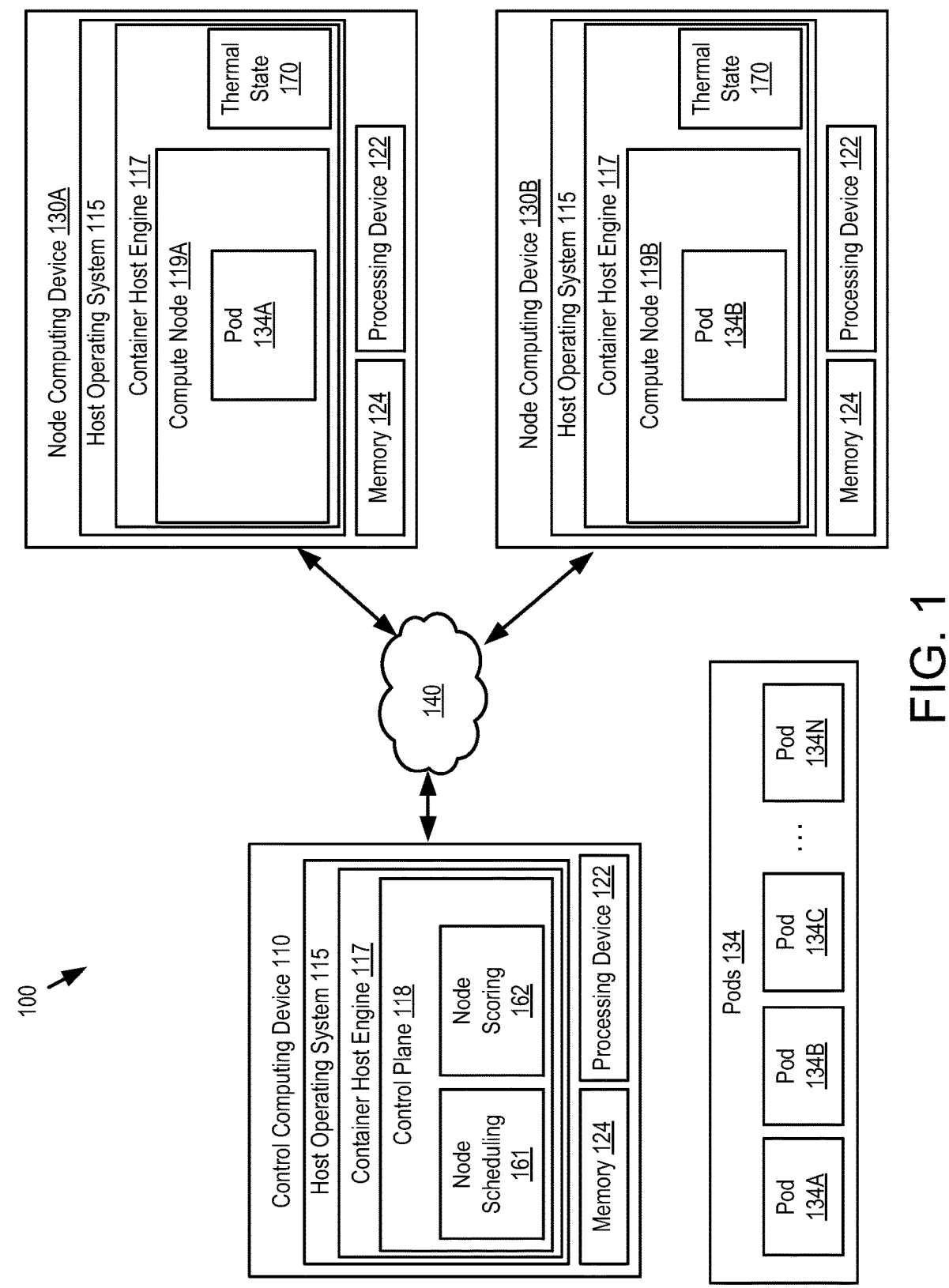
FIG. 1 is a block diagram that illustrates an example system, according to some embodiments of the present disclosure.

In computer systems supporting development and execution of application services, virtual machines and/or containers may be used. As an example, a virtual machine ("VM") may be a robust simulation of an actual physical computer system utilizing a hypervisor to allocate physical resources to the virtual machine. As another example, containers are active components executing on an operating system of a host system that provide an environment for applications to run, while being isolated from any other components of the host system. Multiple containers may execute on a single operating system kernel and share the resources of the hardware upon which the operating system is running.

Container-based virtualization systems may be lighter weight than systems using virtual machines with hypervisors. Containers may allow widespread, parallel deployment of computing power for specific tasks. For example, a container may be instantiated to process a specific task and terminated after the task is complete. In large scale implementations, container orchestrators (e.g., Kubernetes®) may be used that manage the deployment and scheduling of large numbers of containers across multiple compute nodes. One example of a container orchestration platform is the Red Hat™ OpenShift™ platform built around Kubernetes.

Container orchestrators may employ cluster infrastructures. Cluster infrastructures may include a number of applications providing services (e.g., containers and/or VMs, also referred to as the data plane) and a control plane that manages the execution and/or distribution of the applications on one or more compute nodes. In a cluster infrastructure for containers, the compute nodes, which may include physical hosts, processors on a physical host, or virtual machines, may be configured as resources for execution of the containers. The container orchestrators may move the containers between and among the compute nodes as part of managing the execution of the containers. The control plane of the cluster infrastructure may perform the scheduling and/or load balancing of the containers, and their associated applications, among the compute nodes.

The compute nodes, however, may be subject to variation in operation due to thermal energy, which can affect the performance of the containers. When a central processing unit (CPU) of the compute node, or a core of the CPU, is running at a high temperature, thermal control of the CPU may prevent or inhibit the CPU/core from executing at a high frequency. For example, when some CPUs exceed a thermal design temperature, the CPU may perform thermal throttling, also referred to as power capping, which adjusts a frequency of operations of the CPU so as to lower the CPU's temperature. Such dynamic control may cause performance issues for new or existing workloads. Beyond CPU throttling, an increase in temperature of one or more CPUs/cores of a compute node may increase the operation of a cooling infrastructure of the compute node (e.g., cooling fans, liquid circulators, etc.). The increased operation of the cooling infrastructure may exacerbate energy consumption due to an excessive power drain in the cooling system.

In some environments, the control plane of the cluster infrastructure may perform the scheduling and/or load balancing of the containers. In some cases, this scheduling/load-balancing is performed based on a utilization of the compute nodes (e.g., a CPU utilization of a CPU/core of the compute node). The utilization of the CPU/core may refer to an amount of time, often expressed as a percentage, in which the CPU/core is actively performing operations (as opposed to idle time). As recognized by the inventors, not all CPU instructions produce the same amount of thermal energy. Instructions that use more circuit logic tend to produce more thermal energy than simple instructions. For instance, floating-point instructions use more circuit logic and may consume more energy than integer instructions. As a result, utilization does not always correlate with thermal conditions. For example, a CPU that is very busy performing integer instructions may be cooler than a CPU that is less busy, but is performing a floating point operation. As a result, a scheduling algorithm that is solely based on utilization may be subject to variations in operation (e.g., a speed of operation) due to thermal effects that are not accurately reflected by existing utilization-based CPU accounting/scheduling operations.

Although thermal throttling impacts most workloads, not every application suffers the same. Some computing environments use serverless functions Serverless is a cloud-native development model that allows developers to build and run applications without having to manage the servers providing the applications. There are typically still servers present in a serverless model, but they are abstracted away from the development of the application. For example, a cloud provider may handle the routine work of provisioning, maintaining, and scaling the server infrastructure. Developers can simply package their code for deployment. Serverless functions, which are often implemented using containers and/or container clusters, may be more vulnerable to thermal pressure-related performance capping due to their short life cycle and CPU utilization-based auto-scaling algorithms. For example, a serverless function may use more instructions that are not proportionally related to CPU/core utilization. In such a scenario, the thermal throttling effect may limit the CPU/core frequency for the compute node performing the serverless function, leading to lower resource availability, thus mistakenly penalizing the serverless function.

The present disclosure addresses the above-noted and other deficiencies by providing a thermal aware scheduler. The thermal-aware scheduler may be informed of the thermal conditions on the various compute nodes executing the serverless functions (e.g., containers), and may decide where to dispatch the workloads, or whether to migrate existing workloads, based on the thermal conditions.

In some embodiments, the thermal-aware scheduler may dispatch workloads more aggressively (e.g., packing) when the overall thermal temperature of the CPU cores is low, and may dispatch the workloads less aggressively (e.g., spreading) when the overall thermal temperature of a CPU core is high or is not evenly distributed among the cores of the CPU, which may be a sign that a CPU thermal pressure relief algorithm is not functioning properly due to various constraints. In some embodiments, the thermal-aware scheduler may stop dispatching new workloads to a CPU core when the thermal temperature is above a predefined threshold or after an extended period of uneven thermal pressure distribution among the cores of the CPU.

For example, a node scoring component may be added to the scheduler of a container orchestrator. The node scoring component may have a higher preference to dispatch a workload to a compute node responsive to the compute node's thermal temperature (node CPU temperature variance) being lower than a target temperature (the target node CPU temperature variance). The compute node preference may significantly drop when its thermal temperature (node CPU temperature variance) exceeds the target temperature. In some embodiments, the compute node preference may be, in part, based on whether the serverless function (e.g., a container) being scheduled is likely to instructions likely to have a more significant impact on the thermal energy of the compute node.

In some embodiments, the thermal-aware scheduler may maintain a consistency of operation in the workloads. For example, in some embodiments, the thermal-aware schedule may attempt to maintain a preference for a given workload within a same execution environment. For example, if a given workload was previously executing on a compute node that was experiencing thermal throttling, the node scoring component of the thermal-aware schedule may exhibit a preference for continuing to schedule the workload on a compute node that is also experiencing thermal throttling (either the prior compute node or another computer node that is also throttling). While this may seem counter-intuitive, in some cases, a consistency of operation may be more important for a workload than raw performance. Thus, in an environment in which thermal throttling may be impossible to avoid, a thermal-aware scheduler may attempt to maintain consistency in the scheduling of the workload so as to not cause swings in performance if the workload moves from a compute node that is experiencing thermal throttling to a compute node that is not.

Embodiments of the present disclosure may provide a technological solution that reduces a variance in the execution of container workloads by avoiding or minimizing disruptions caused by thermal throttling. By scheduling the workloads to reduce opportunities for excessive thermal energy during execution of the workloads on CPU cores, the thermal-aware scheduler may reduce thermal throttling and/or excessive cooling and, thus, reduce opportunities for the performance of the workload to decrease. The thermal-aware scheduler may also reduce power consumption of the system, as excessive cooling may be reduced and/or avoided.

FIG. 1 is a block diagram that illustrates an example system 100, according to some embodiments of the present disclosure. FIG. 1 and the other figures may use like reference numerals to identify like elements. A letter after a reference numeral, such as "134A," indicates that the text refers specifically to the element having that particular reference numeral. A reference numeral in the text without a following letter, such as "134," refers to any or all of the elements in the figures bearing that reference numeral.

As illustrated in FIG. 1, the system 100 includes a control computing device 110, and a plurality of node computing devices 130. In some embodiments, system 100 may be a container cluster, though the embodiments of the present disclosure are not limited to such a configuration. In FIG. 1, a first node computing device 130A and a second node computing device 130B are illustrated, but the embodiments of the present disclosure are not limited to two node computing devices 130. The computing devices 110 and 130 may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g. cell towers), etc. In some embodiments, the network 140 may be an L3 network. The network 140 may carry communications (e.g., data, message, packets, frames, etc.) between the control computing device 110 and the node computing devices 130.

Each computing device 110, 130 may include hardware such as processing device 122 (e.g., processors, central processing units (CPUs), memory 124 (e.g., random access memory 124 (e.g., RAM), storage devices (e.g., hard-disk drive (HDD), solid-state drive (SSD), etc.), and other hardware devices (e.g., sound card, video card, etc.).

Processing device 122 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 122 may also include one or more special-purpose processing devices such as an application specific integrated circuit (ASIC), a field programmable gate array (FPGA), a digital signal processor (DSP), network processor, or the like.

Memory 124 may include volatile memory devices (e.g., random access memory (RAM)), non-volatile memory devices (e.g., flash memory) and/or other types of memory devices. In certain implementations, memory 124 may be non-uniform access (NUMA), such that memory access time depends on the memory location relative to processing device 122. In some embodiments, memory 124 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 124 may be configured for long-term storage of data and may retain data between power on/off cycles of the computing devices 110, 130.

Each computing device 110, 130 may comprise any suitable type of computing device or machine that has a programmable processor including, for example, server computers, desktop computers, laptop computers, tablet computers, smartphones, set-top boxes, etc. In some examples, each of the computing devices 110, 130 may comprise a single machine or may include multiple interconnected machines (e.g., multiple servers configured in a cluster). The computing devices 110, 130 may be implemented by a common entity/organization or may be implemented by different entities/organizations. For example, control computing device 110 may be operated by a first company/corporation and one or more node computing devices 130 may be operated by a second company/corporation.

Each of the control computing device 110 and the node computing devices 130 may execute or include an operating system (OS) such as host OS 115 of control computing device 110 and host OS 115 of the node computing devices 130, as discussed in more detail below. The host OS 115 of the computing devices 110, 130 may manage the execution of other components (e.g., software, applications, etc.) and/or may manage access to the hardware (e.g., processors, memory, storage devices etc.) of the computing devices 110, 130. In some embodiments, the host OS 115 of the control computing device 110 may be different from the host OS 115 of one or more of the node computing devices 130.

In some embodiments, the control computing device 110 may implement a control plane 118 (e.g., as part of a container orchestration engine). The control plane 118 may perform scheduling and/or load-balancing operations on a plurality of pods 134. Further detail on the structure of the pods 134 and the scheduling/load-balancing operations of the control plane 118 will be described herein. In some embodiments, the node computing devices 130 may each implement a compute node 119 (e.g., as part of the container orchestration engine). The compute nodes 119 may execute one of the plurality of pods 134, as will be described further herein.

In some embodiments, a container orchestration engine 117 (also referred to herein as container host engine 117), such as the Redhat™ OpenShift™ module, may execute on the host OS 115 of the control computing device 110 and the host OS 115 of the node computing devices 130. The container host engine 117 may be a platform for developing and running containerized applications and may allow applications and the data centers that support them to expand from just a few machines and applications to thousands of machines that serve millions of clients. Container host engine 117 may provide an image-based deployment module for creating containers and may store one or more image files for creating container instances. Many application instances can be running in containers on a single host without visibility into each other's processes, files, network, and so on. In some embodiments, each container may provide a single function (often called a "micro-service") or component of an application, such as a web server or a database, though containers can be used for arbitrary workloads. In this way, the container host engine 117 provides a function-based architecture of smaller, decoupled units that work together. Though the description provided herein focuses on the use of software containers within the container host engine 117, the embodiments of the present disclosure may be similarly used with the respect to VMs, or VMs executing software containers.

In some embodiments, container host engine 117 may include a storage driver (not shown), such as OverlayFS, to manage the contents of an image file including the read only and writable layers of the image file. The storage driver may be a type of union file system which allows a developer to overlay one file system on top of another. Changes may be recorded in the upper file system, while the lower file system (base image) remains unmodified. In this way, multiple containers may share a file-system image where the base image is read-only media.

An image file may be stored by the container host engine 117 or a registry server. In some embodiments, the image file may include one or more base layers. An image file may be shared by multiple containers. When the container host engine 117 creates a new container, it may add a new writable (e.g., in-memory) layer on top of the underlying base layers. However, the underlying image file remains unchanged. Base layers may define the runtime environment as well as the packages and utilities necessary for a containerized application to run. Thus, the base layers of an image file may each comprise static snapshots of the container's configuration and may be read-only layers that are never modified. Any changes (e.g., data to be written by the application running on the container) may be implemented in subsequent (upper) layers such as in-memory layer. Changes made in the in-memory layer may be saved by creating a new layered image.

By their nature, containerized applications are separated from the operating systems 115 where they run and, by extension, their users. The control plane 118 may expose applications to internal and external networks by defining network policies that control communication with containerized applications (e.g., incoming hypertext transfer protocol (HTTP) or hypertext transfer protocol secure (HTTPS) requests for services inside the system 100).

An example deployment of the container host engine 117 may include the control plane 118 on one or more control computing devices 110 and a cluster of compute nodes 119, including compute nodes 119A and 119B, on one or more node computing devices 130. The compute nodes 119 may run the aspects of the container host engine 117 that are utilized to launch and manage containers, pods 134, and other objects. For example, a compute node 119 may be a physical server that provides the processing capabilities required for running containers in the environment. A compute node 119 may also be implemented as a virtual server, logical container, or GPU, for example.

While the container image is a unit from which containers may be deployed, the basic units that the container host engine 117 may work with are called pods 134. A pod 134 may refer to one or more containers deployed together on a single node computing device 130, and is the smallest compute unit that can be defined, deployed, and managed. There are numerous different scenarios when a new pod 134 may be created. For example, a serverless function may need to scale, and one or more new pods 134 may be created and deployed to additional compute nodes 119 of node computing devices 130 to manage requests for serverless functions provided by containers contained within the pods 134.

The control plane 118 of the control computing device 110 may also run node scheduling service 161 that may be responsible for determining placement of (i.e., scheduling) new pods 134 onto compute nodes 119 within the system 100. The node scheduling service 161 may read data from the pod 134 and attempt to find a compute node 119 that is a good fit based on configured policies. Once a suitable compute node 119 is found, the node scheduling service 161 may create a binding for the pod 134 that ties the pod 134 to the particular compute node 119. The node scheduling service 161 may consider the resource needs of a pod 134, such as processing devices 122 and/or memory 124, along with the health of the system 100, when making scheduling decisions about the pod 134 to an appropriate compute node 119.

Each pod 134 may be allocated its own internal IP address, and therefore may own its entire port space. A user (e.g., via the container host engine 117) may define the entry point script of a pod 134 to instruct the pod 134 to configure itself as a unique simulated worker node with its own IP addresses and simulated network stacks and communicate with the internal API of the control plane 118. Containers within pods 134 may share their local storage and networking. For example, a pod 134 may comprise a shared network namespace and all of the containers in the pod 134 may share that same network namespace. Although a pod 134 may contain one or more than one container, the pod 134 is the single unit that a user may deploy, scale, and manage.

As illustrated in FIG. 1, the control plane 118 of the control computing device 110 may schedule a plurality of pods 134. For example, FIG. 1 illustrates pods 134A to 134N. The control plane 118 may select one or more of the pods 134 for execution on the compute nodes 119. In FIG. 1, it is illustrated that a first compute node 119A of a first node computing device 130A executes a first pod 134A, while a second compute node 119B of a second node computing device 130B executes a second pod 134B.

The control plane 118 of the control computing device 110 may schedule and/or load-balance the pods 134 on the compute nodes 119 using node scheduling service 161. The node scheduling service 161 may be thermal-aware. In other words, the node scheduling service 161 may be configured to take a thermal state 170 of the node computing devices 130 into account when scheduling the pods 134.

The thermal state 170 of the node computing device 130 may refer to a thermal condition of one or more physical components of the node computing device 130. For example, the thermal state 170 may refer to a temperature or other measurement related to thermal energy of the node computing device 130. In some embodiments, the thermal state 170 may maintain information for each CPU and/or core of the node computing device 130. In some embodiments, the thermal state 170 may indicate whether one or more CPUs and/or cores of the node computing device 130 is experiencing thermal throttling in which a frequency of the CPU and/or core is altered to reduce a temperature profile of the CPU and/or core.

As part of selecting a compute node 119 upon which to execute a pod 134, the node scheduling service 161 may utilize a node scoring service 162. The node scoring service 162 may review the available compute nodes 119 of the node computing devices 130 to select an appropriate compute node 119 upon which to execute a pod 134. In some embodiments, the node scoring service 162 may select a best candidate from the available compute nodes 119, and the node scheduling service 161 may schedule the pod 134 on the compute node 119 responsive to the score provided by the node scoring service 162.

In some embodiments, a score generated by the node scoring service 162 may be based, at least in part, on the thermal state information 170 of the CPUs and/or cores of the node computing device 130. In some embodiments, as part of selecting a compute node 119 for scheduling of a pod 134, the node scoring service 162 and/or the node scheduling service 161 may request the thermal state 170 from each of the node computing devices 130. For example, the node scoring service 162 and/or the node scheduling service 161 may transmit a request (e.g., over the network 140 and/or through the container host engine 117) to the node computing device 130. In response to the request, the node computing device 130 may transmit (e.g., over the network 140 and/or through the container host engine 117) the thermal state information 170 to the control computing device 110.

The node scoring service 162 may analyze the thermal state information 170 from each of the node computing devices 130 to determine a score for each of the compute nodes 119 as part of scheduling a pod 134. For example, the node scoring service 162 may compare the thermal state information 170 for each of the node computing devices to a threshold value. In some embodiments, the threshold value may be set to correspond to a thermal level of a CPU and/or core of the node computing device 130 that is associated with thermal throttling (e.g., a temperature beyond which the CPU and/or core will begin throttling). In some embodiments, the threshold value may be offset from the thermal level associated with thermal throttling to allow for a safety margin. In some embodiments, the threshold value may be set to correspond to a thermal level of a CPU and/or core of the node computing device 130 that is associated with increased cooling (e.g., a temperature beyond which a fan or other cooling system is engaged). In some embodiments, the threshold value may be offset from the thermal level associated with increased cooling to allow for a safety margin.

The comparison to the threshold value may allow the node scoring service 162 to determine which, if any, of the compute nodes 119 are close to experiencing thermal throttling that would result in a performance variation for an executing pod 134 and/or excessive cooling activity that would result in an excessive power expenditure should the executing pod 134 cause the cooling system to engage on the node computing device 130.

In some embodiments, should the node scoring service 162 determine that the thermal state information 170 has exceeded the threshold value, the node scoring service 162 may lower a score (e.g., make less likely) of the compute node 119 as a recipient of the pod 134 to be executed. Thus, when the thermal state information 170 of the node computing device 130 exceeds the threshold value, the node scoring service 162 may reduce a likelihood that a pod 134 will be scheduled to run on a compute node 119 of the node computing device 130. As a result, the node scheduling service 161 may cease, or reduce, scheduling pods 134 on a node computing device 130 as the thermal activity of the node computing device 130 approaches a level that would result in thermal throttling and/or excessive cooling activity.

In some embodiments, the node scoring service 162 may maintain two threshold values for comparison to the thermal state information 170. The two threshold values may include a first threshold value associated with thermal throttling of the CPU/core and the second threshold value may be associated with a lower thermal energy than the first threshold value. In some embodiments, the node scoring service 162 may use the two threshold values to begin slowing the scheduling of pods 134 to compute nodes 119 of a node computing device 130 prior to ceasing to schedule the pods 134 on the node computing device 130.

For example, when the thermal state information 170 of the CPUs/cores of the node computing device 130 are less than the second threshold value, the node scoring service 162 may score the compute nodes 119 for scheduling such that pods 134 are scheduled on the compute nodes 119 of the node computing device 130 without limit. This may be referred to as packing. When the thermal state information 170 of the CPUs/cores of the node computing device 130 are greater than the second threshold value but less than the first threshold value, the node scoring service 162 may score the compute nodes 119 for scheduling such that pods 134 are still scheduled on the compute nodes 119 but with less frequency such that fewer pods 134 are sent to the compute nodes 119 of the node computing device 130. This may be referred to as spreading. When the thermal state information 170 of the CPUs/cores of the node computing device 130 are greater than the first threshold value, the node scoring service 162 may score the compute nodes 119 for scheduling such that pods 134 are not scheduled on the compute nodes 119 of the node computing device 130, so as to avoid and/or reduce the possibility of thermal throttling.

Though the node scheduling service 161 and the node scoring service 162 are illustrated as separate components in FIG. 1, this is for convenience of description only. In some embodiments, both the node scheduling service 161 and the node scoring service 162 may be a single module or executable circuit.

The control plane 118 of FIG. 1 may allow for thermally-aware scheduling of pods 134 within the system 100. By querying the thermal state information 170 associated with each of the compute nodes 119, the node scheduling service 161 may be made aware of the thermal condition of each of the compute nodes 119 such that the thermal state of the compute node 119 may be taken into account as part of the scheduling. In some embodiments, the control plane 118 may reduce and/or cease scheduling pods 134 to a compute node 119 as a CPU and/or core of the node computing device 130 that is associated with the compute node 119 nears a thermal condition that may be associated with thermal throttling and/or excessive cooling.

Figure 2:
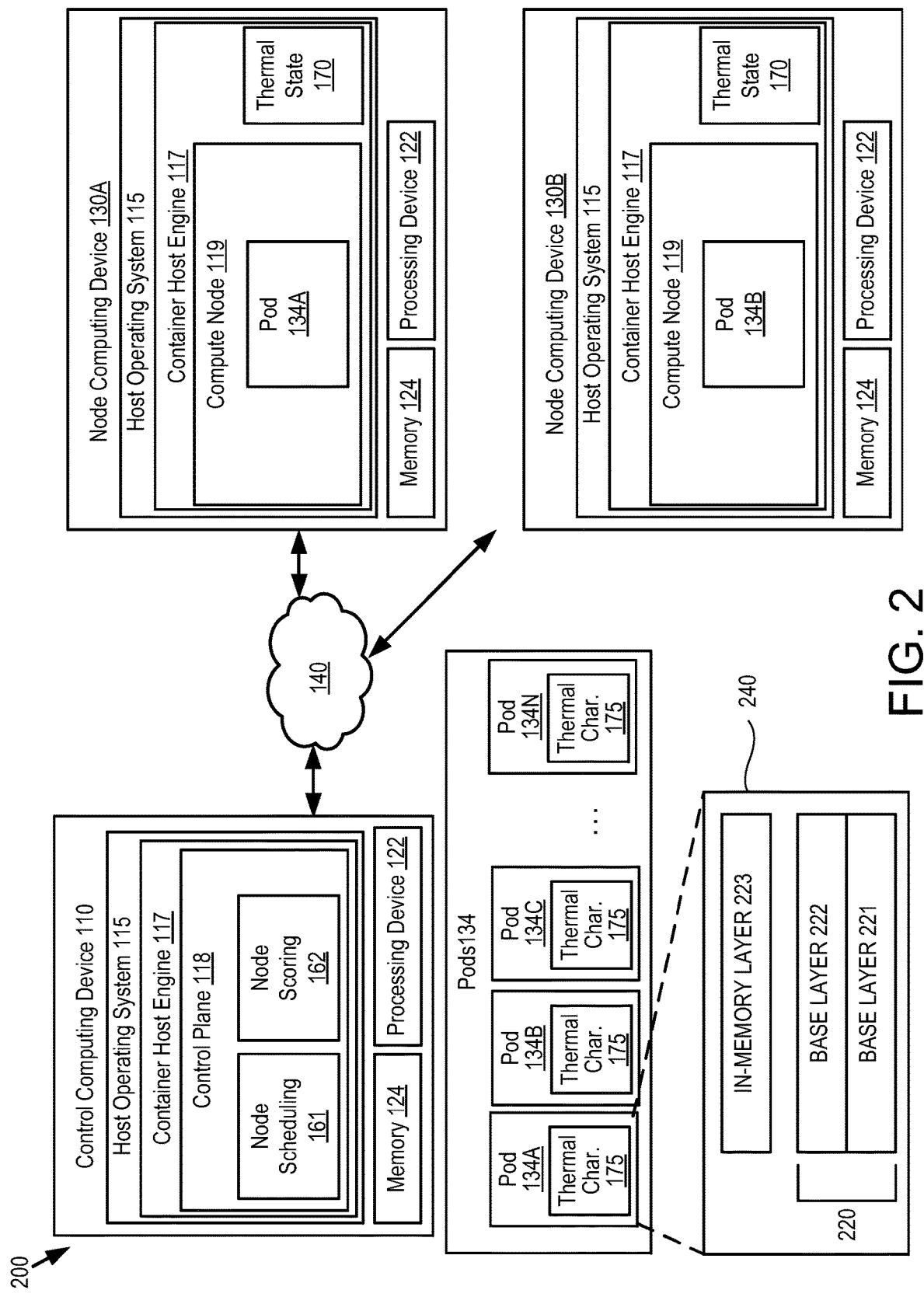
FIG. 2 is a block diagram that illustrates an example system, according to some embodiments of the present disclosure.

FIG. 2 is a block diagram that illustrates an example system 200, according to some embodiments of the present disclosure. A description of elements of FIG. 2 that have been previously described will be omitted for brevity.

Referring to FIG. 2, a system 200 may utilize additional thermal information to perform more granular scheduling of pods 134 onto compute nodes 119. For example, as part of rating compute nodes 119 for execution of pods 134, the node scoring service 162 may analyze thermal characteristics 175 of the pods 134 to determine if the pods 134 are thermally sensitive. A thermally sensitive pod 134 may refer, for example, to a pod 134 that may be likely to have a larger impact on the thermal environment of a compute node 119 and/or node computing device 130. For example, the thermal characteristics 175 of the pod 134 may indicate the pod 134 is a thermally sensitive pod 134 if execution of the pod 134 is likely to appreciably increase the thermal energy of a compute node 119 and/or its associated node computing device 130.

As previously discussed, not all CPU instructions produce the same amount of thermal energy. Instructions that use more circuit logic tend to produce more thermal energy than simple instructions. For instance, floating-point instructions may use more circuit logic and may consume more energy than integer instructions. In some embodiments, determining whether a given compute node 119 is thermally sensitive may include determining and/or estimating the types of instructions performed by the pod 134 and/or measuring a thermal impact of the pod 134 on a compute node 119.

In some embodiments, if the thermal characteristics 175 of a pod 134 indicate that the pod 134 is thermally sensitive, the pod 134 may not be scheduled on a compute node 119 in which the thermal state information 170 has exceeded the threshold value or is approaching the threshold value. In some embodiments, the thermal state information 170 may not be used as part of the scheduling decision if the pod 134 is not considered thermally sensitive, though the embodiments of the present disclosure are not limited to such a configuration. For example, if a given pod 134 is designated as a thermally sensitive pod 134, the node scheduling service 161 and/or the node scoring service 162 may review the thermal state information 170 of the node computing devices 130 as described herein with respect to FIG. 1. However, if the pod 134 is not designated as thermally sensitive, the pod 134 may be scheduled on any otherwise acceptable compute node 119, regardless of the thermal state information 170 of the node computing device.

Generating the thermal characteristics 175 that determine whether a given pod 134 is a thermally sensitive pod 134 may be performed in a number of different ways. For example, in some embodiments, the control plane 118 may initially monitor an execution of the pod 134 on one or more of the compute nodes 119. For example, the control plane 118 may retrieve the thermal state information 170 from the compute node 119 (or the node computing device 130 associated with the compute node 119) immediately prior to, and immediately after, executing the pod 134 on the compute node 119. If the it is determined that the pod 134 has resulted in a statistically significant deviation of the thermal state information 170 as a result of the execution of the pod 134 (e.g., by comparing the before and after snapshots of the thermal state information 170), the pod 134 in question may be designated as a thermally sensitive pod 134. The fact that the pod 134 is thermally sensitive (or other data associated with the thermal properties and/or impact of the pod 134) may be saved as part of the thermal characteristics 175 of the pod 134.

In some embodiments, metadata associated with the pod 134 and/or a container of the pod 134 may be analyzed to determine if the pod 134 has thermal characteristics 175 that would indicate it is a thermally sensitive pod 134. For example, recognizing that logically complex operations, such as floating point operations, may have a larger thermal impact, an analysis may be made as to whether metadata of the pod 134 and/or a container of the pod 134 indicates that complex operations (e.g., floating point operations) are to be performed. As a non-limiting example, a label may be provided for the pod 134 as the thermal characteristic 175 indicating that the pod 134 is thermally sensitive. The label may be applied, for example, by a developer of the pod 134 and/or a container of the pod 134 to designate the included functions as thermally sensitive.

In some embodiments a structure of a container 240 of the pod 134 may be analyzed to generate the thermal characteristics 175. As described herein, the pod 134 may include one or more containers 240 that may be executed when the pod 134 is scheduled on a compute node 119.

Figure 3:
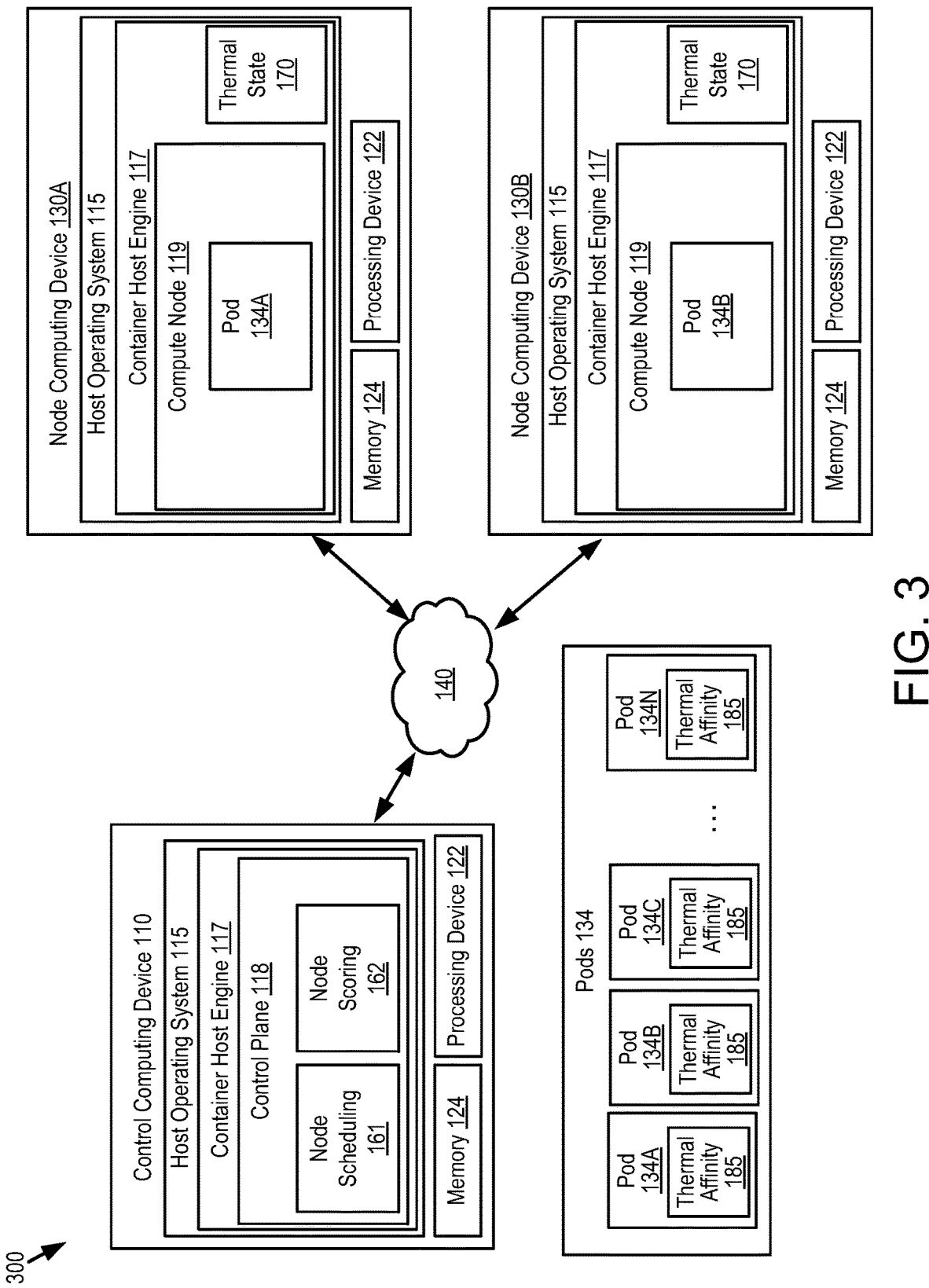
FIG. 3 is a block diagram that illustrates an example system, according to some embodiments of the present disclosure.

FIG. 2 illustrates an example container image 220 from which the container 240 may be generated. In some embodiments, as illustrated in FIG. 3, the container image file 220 may include base layers 221 and 222. In some embodiments, the container image 220 may be shared by multiple containers 240. When a new container 240 is created, a new writable (e.g., in-memory) layer may be added on top of the underlying base layers 221, 222. This new writable layer is illustrated as the in-memory layer 223 in FIG. 2. When the container 240 is deleted, the in-memory layer 223 is also deleted. However, the underlying container image 220 remains unchanged. Although illustrated as having two base layers 221, 222 for simplicity, container image 220 may include any suitable number of base layers. Base layers 221, 222 may define the runtime environment as well as the packages and utilities necessary for a containerized application to run. In the example of FIG. 2, base layer 221 may comprise the application infrastructure (including e.g., configuration files and/or software packages supporting the container application, including any associated libraries, binary and/or source files etc.), on which the container application may run. The base layer 222 may comprise the container application itself. Thus, base layers 221 and 222 may each comprise static snapshots of the configuration of container 240 and may be read-only layers that are not modified. Any changes (e.g., data to be written by the container application) may be implemented in subsequent (upper) layers such as in-memory layer 223.

In some embodiments, to determine the thermal characteristics 175, one or more of the base layers 221, 222 of the container image 220 may be analyzed. For example, the contents of the objects and/or infrastructure of the base layers 221, 222 may be analyzed to generate the thermal characteristics 175. As a non-limiting example, the contents of the base layers 221, 222 may be reviewed to determine if there are packages, libraries, object code, and/or applications within the base layers 221, 222 that are associated with instructions or operations that may tend to increase the thermal energy of a compute node 119. For example, the packages, libraries, object code, and/or applications of the base layers 221, 222 may be broken out and compared to existing mappings or other recorded knowledge as to the contents of the packages, libraries, object code, and/or applications. In some embodiments, the contents of the base layers 221, 222 may be analyzed to determine if floating point operations or other operations that might involve a higher level of usage of logic circuitry of a CPU/core of a node computing device 130 are included. If the contents of the base layers 221, 222 indicate that such thermally-impactful infrastructure is present within the base layers 221, 222, the thermal characteristics 175 of the pod 134 may be adjusted to indicate that the pod 134 is thermally sensitive. As a non-limiting example, the base layers 221, 222 of each container 240 of the pod 134 may be analyzed to determine if functionality for floating point operations (e.g., statistical and/or mathematical operations), machine learning operations, single instruction, multiple data (SIMD) operations, and the like are present within the base layers 221, 222.

By designating certain pods 134 as thermally sensitive (e.g., through the use of thermal characteristics 175), the system 200 can limit modifications to a scheduling algorithm to those pods 134 that are most likely to have a thermal impact on a compute node 119 and/or CPU/core of a node computing device 130. This may allow for avoiding and/or reducing pods 134 which are likely to invoke thermal throttling from executing on compute nodes 119 that are within a margin of reaching the throttling threshold.

FIG. 3 is a block diagram that illustrates an example system 300, according to some embodiments of the present disclosure. A description of elements of FIG. 3 that have been previously described will be omitted for brevity.

Referring to FIG. 3, a system 300 may utilize additional thermal affinity to perform more consistent scheduling of pods 134 onto compute nodes 119. For example, as part of rating compute nodes 119 for execution of pods 134, the node scoring service 162 may analyze a thermal affinity 185 of the pods 134 to determine a preferable compute node 119 upon which to schedule the pod 134. The thermal affinity 185 may indicate the thermal state information 170 of the compute node 119 upon which the pod 134 previously ran. For example, if the pod 134 previously executed on a compute node 119 of a node computing device 130 undergoing thermal throttling (as indicated by the thermal state information 170 of the node computing device 130), the thermal affinity 185 of the pod 134 may indicate as much. Similarly, if the pod 134 previously executed on a compute node 119 of a node computing device 130 that was thermally operating below the threshold for thermal throttling (as indicated by the thermal state information 170 of the node computing device 130), the thermal affinity 185 of the pod 134 may indicate as much.

As previously discussed, some serverless functions may benefit from consistency of operation. Consistency of operation does not necessarily mean that all serverless functions are to run at a high performance level. Instead, consistency may mean that a serverless function that previously ran at a medium or low performance continues to run at the same level of performance. To facilitate this consistency in a thermally-aware environment, the node scheduling service 161 and/or the node scoring service 162 may incorporate the thermal affinity 185 for each of the pods 134 so as to attempt to schedule the pod 134 on compute nodes 119 having a similar thermal state.

When selecting a compute node 119 upon which to schedule the pod 134, the node scoring service 162 may compare the information of the thermal affinity 185 of the pod 134 with the thermal state information 170 of the compute node 119 and/or node computing device 130. The node scoring service 162 may increase a scheduling score for compute nodes 119 whose thermal state information 170 is consistent with the thermal affinity 185 of the pod 134 (e.g., the thermal state information 170 of the compute node 119 upon which the pod 134 previously executed). In some embodiments, the thermal affinity 185 of the pod 134 may be updated each time the pod 134 is executed on a different compute node 119 (e.g., to reflect the thermal state information 170 of the compute node 119 into the thermal affinity 185).

By designating incorporating thermal affinity 185 into the scheduling decisions for the pods 134, the system 300 can increase a consistency of operation for the serverless functions being executed by the pods 134. This may allow for more predictable operation for the pods 134 and may make resource planning for the system 300 easier, as the operation of the pods 134 may be easier to extrapolate to understand impacts for scaling.

Figure 4:
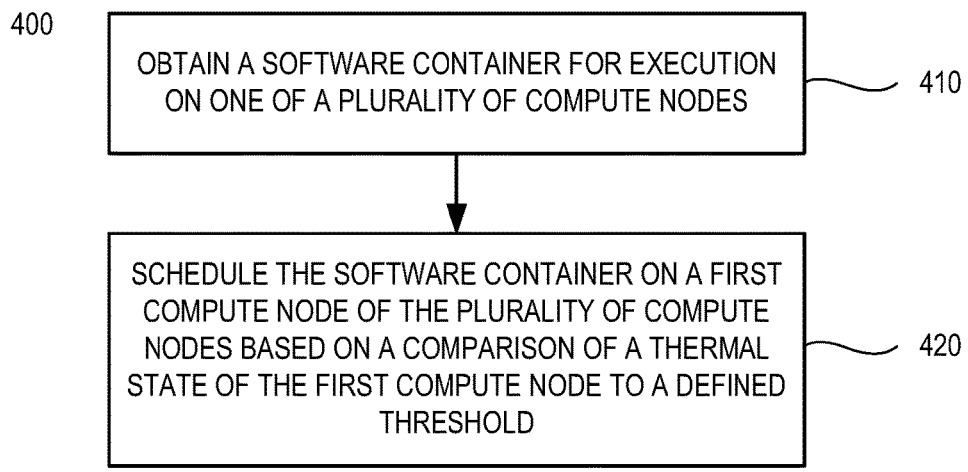
FIG. 4 is a flow diagram of a method for scheduling a software container, in accordance with some embodiments of the present disclosure

FIG. 4 is a flow diagram of a method 400 for scheduling a software container, in accordance with some embodiments of the present disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a computing device (e.g., computing device 120 illustrated in FIGS. 1 to 3).

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Referring simultaneously to FIGS. 1 to 3 as well, the method 400 begins at block 410, in which a software container is obtained for execution on one of a plurality of compute nodes 119. In some embodiments, the software container 240 may correspond to a container of a pod 134, as described herein with respect to FIGS. 1 to 3.

At block 420, the software container is scheduled on a first compute node 119A of the plurality of compute nodes 119 based on a comparison of a thermal state 170 of the first compute node 119 to a defined threshold. In some embodiments, scheduling the software container 240 on the first compute node 119A of the plurality of compute nodes based on the comparison of the thermal state 170 of the first compute node 119 to the thermal threshold comprises scheduling the software container 240 on the first compute node 119A responsive to the thermal state 170 of the first compute node 119A being less than a thermal capping temperature of a processor core associated with the first compute node 119A.

In some embodiments, the method 400 further includes requesting the thermal state 170 from the first compute node 119 over a network 140 and receiving the thermal state 170 of the first compute node 119 over the network 140 responsive to the request.

In some embodiments, the method 400 further includes analyzing one or more components of the software container 240 to determine a thermal characteristic 175 of the software container 240. In some embodiments, scheduling the software container 240 on the first compute node 119 is further based on the thermal characteristic 175 of the software container 240. In some embodiments, analyzing the one or more components of the software container 240 to determine the thermal characteristic 175 of the software container comprises determining a functionality associated with one or more software components of the software container 240. In some embodiments, analyzing the one or more components of the software container 240 to determine the thermal characteristic 175 of the software container 240 comprises monitoring an execution of the software container 240 on second compute node of the plurality of compute nodes 119 and determining the thermal characteristic 175 of the software container 240 based on a change in a thermal state 170 of the second compute node during the execution of the software container 240.

In some embodiments, the method 400 further includes analyzing one or more components of the software container 240 to determine a thermal affinity 185 associated with the software container 240, the thermal affinity 185 indicating a prior thermal state 170 of a prior compute node from a prior execution of the software container 240. In some embodiments, scheduling the software container 240 on the first compute node 119A is further based on the thermal affinity 185 associated with the software container 240.

Figure 5:
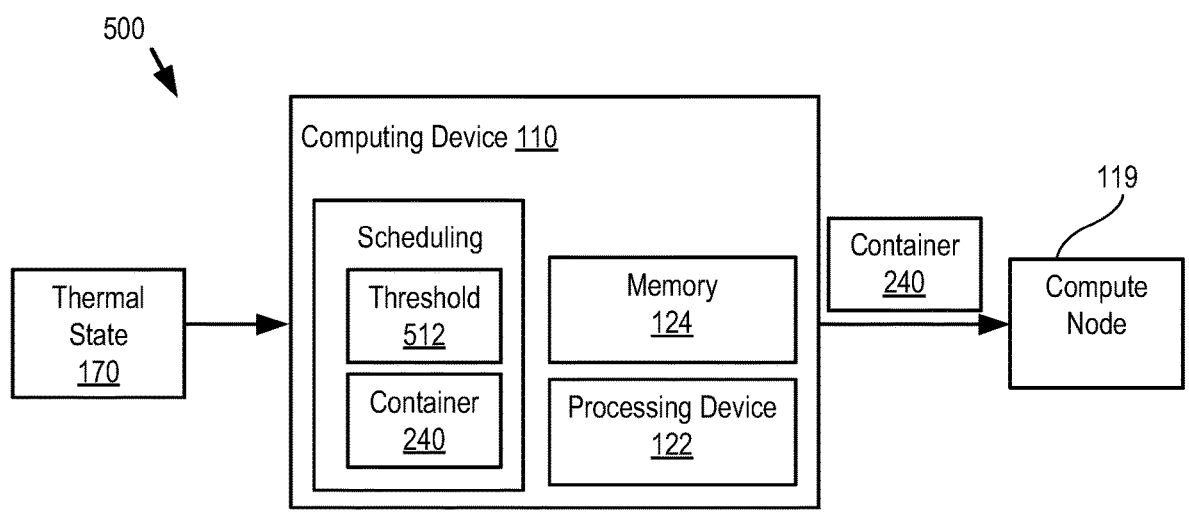
FIG. 5 is a component diagram of an example of a device architecture, in accordance with embodiments of the disclosure.

FIG. 5 is a component diagram of an example of a device architecture 500, in accordance with embodiments of the disclosure. The device architecture 500 includes computing device 110 having processing device 122 and memory 124, as described herein with respect to FIGS. 1 to 4.

The computing device 110 may obtain a software container 240 for execution on one of a plurality of compute nodes 119. The container 240 may be, for example, a software container 240 provide as part of and/or within a pod 134 as described herein with respect to FIGS. 1 to 4. The plurality of compute nodes 119 may be part of a node computing device such as node computing device 130 described herein with respect to FIGS. 1 to 4.

The computing device 110 may schedule the container 240 for executing on the compute node 119. For example, the scheduling may be performed similarly to the operations of the node scheduling service 161 and/or the node scoring service 162 described herein with respect to FIGS. 1 to 4. The scheduling may be based on a thermal state 170 of the compute node 119 and/or the node computing device of the compute node 119. In some embodiments, the scheduling may be based on a comparison of the thermal state information 170 with a thermal threshold 512. In some embodiments, the thermal threshold 512 may correspond and/or be associated with a thermal threshold at which thermal throttling will occur on the compute node 119 and/or the node computing device of the compute node 119. The scheduling operations based on the thermal state information 170 may be performed according to the operations discussed herein with respect to FIGS. 1, 2, and 3.

The device architecture 500 of FIG. 5 provides a technological capability to dynamically adjust scheduling of pods 134 and their associated software container(s) in a manner that takes into account thermal impacts caused by execution of the pods 134. By making the scheduler thermally-aware, thermal throttling of node computing devices 130 may be reduced. In addition, by making the scheduler thermally aware, the operation of the pods 134 may be made more consistent, with less variance in performance.

Figure 6:
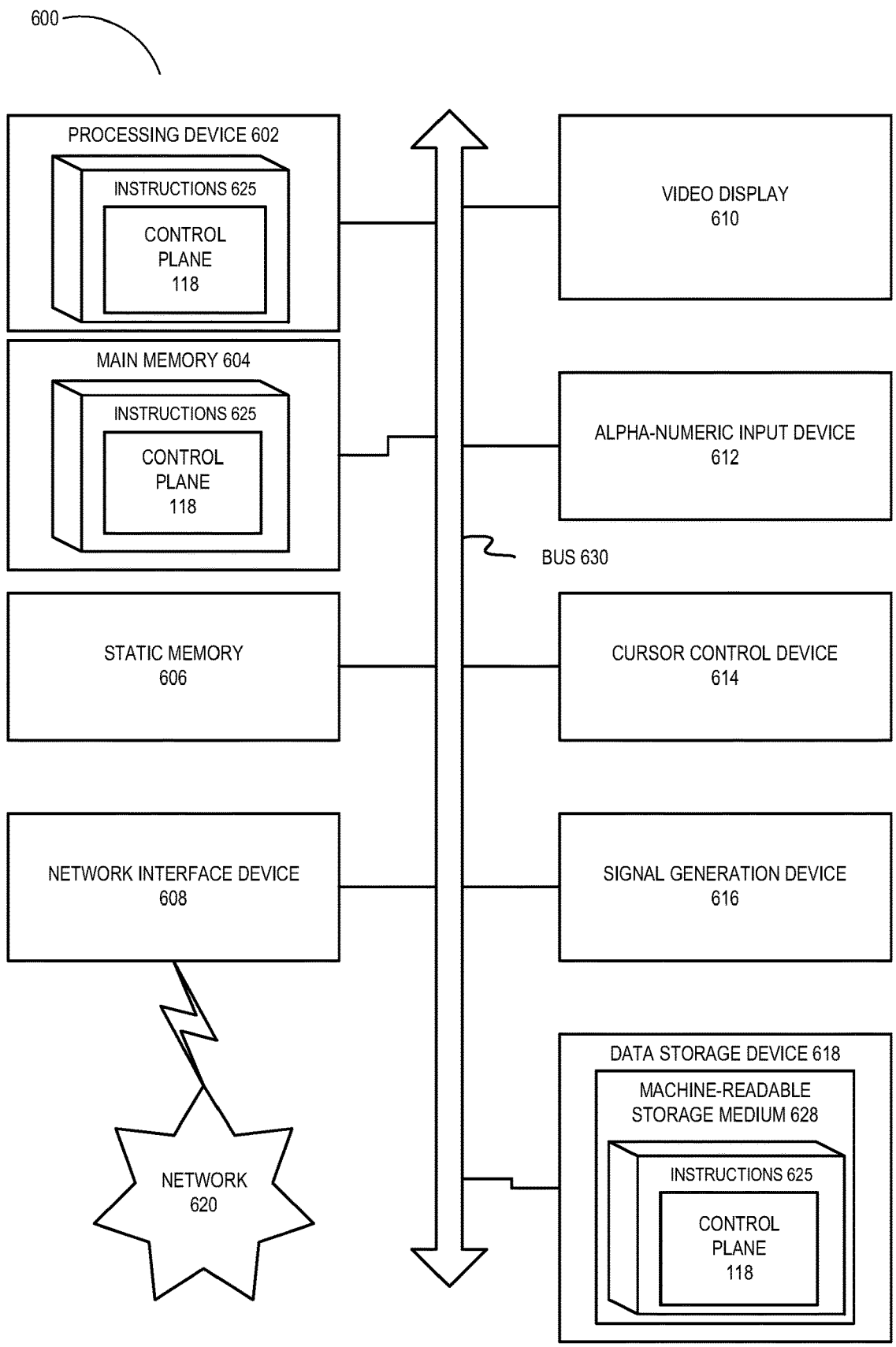
FIG. 6 is a block diagram that illustrates an example system, according to some embodiments of the present disclosure.

FIG. 6 is a block diagram of an example computing device 600 that may perform one or more of the operations described herein, in accordance with some embodiments of the disclosure. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also include one or more special-purpose processing devices such as an application specific integrated circuit (ASIC), a field programmable gate array (FPGA), a digital signal processor (DSP), network processor, or the like. The processing device 602 may execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for a component (e.g., control plane 118, including, but not limited to, node scheduling service 161 and/or node scoring service 162 discussed herein) for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "obtaining," "scheduling," "requesting," "receiving," "analyzing," "monitoring," "determining," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting. As used herein, the term "and/or" includes any and all combination of one or more of the associated listed items.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to"

perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
obtaining a software container for execution on one of a plurality of compute nodes; and
scheduling, by a processing device, the software container on a first compute node of the plurality of compute nodes based on a comparison of a thermal state of the first compute node to a defined threshold, wherein the scheduling of the software container on the first compute node is further based on a thermal characteristic of the software container, wherein the thermal characteristics of the software container are based on whether operations within the software container increase a thermal energy of the first compute node, wherein the defined threshold includes a first threshold associated with thermal throttling and a second threshold associated with a lower thermal energy than the first threshold.

2. The method of claim 1, further comprising:
requesting the thermal state from the first compute node over a network; and
receiving the thermal state of the first compute node over the network responsive to the request.

3. The method of claim 1, further comprising analyzing one or more components of the software container to determine the thermal characteristic of the software container.

4. The method of claim 3, wherein analyzing the one or more components of the software container to determine the thermal characteristic of the software container comprises determining a functionality associated with one or more software components of the software container.

5. The method of claim 3, wherein analyzing the one or more components of the software container to determine the thermal characteristic of the software container comprises:
monitoring an execution of the software container on second compute node of the plurality of compute nodes; and
determining the thermal characteristic of the software container based on a change in a thermal state of the second compute node during the execution of the software container.

6. The method of claim 1, further comprising analyzing one or more components of the software container to determine a thermal affinity associated with the software container, the thermal affinity indicating a prior thermal state of a prior compute node from a prior execution of the software container,
wherein scheduling the software container on the first compute node is further based on the thermal affinity associated with the software container.

7. The method of claim 1, wherein scheduling the software container on the first compute node of the plurality of compute nodes based on the comparison of the thermal state of the first compute node to the defined threshold comprises scheduling the software container on the first compute node responsive to the thermal state of the first compute node being less than a thermal capping temperature of a processor core associated with the first compute node.

8. A system comprising:
a memory; and
a processing device, operatively coupled to the memory, to:
obtain a software container for execution on one of a plurality of compute nodes; and
schedule the software container on a first compute node of the plurality of compute nodes based on a comparison of a thermal state of the first compute node to a defined threshold, wherein the schedule of the software container on the first compute node is further based on a thermal characteristic of the software container, wherein the thermal characteristics of the software container are based on whether operations within the software container increase a thermal energy of the first compute node, wherein the defined threshold includes a first threshold associated with thermal throttling and a second threshold associated with a lower thermal energy than the first threshold.

9. The system of claim 8, wherein the processing device is further to:
request the thermal state from the first compute node over a network; and
receive the thermal state of the first compute node over the network responsive to the request.

10. The system of claim 8, wherein the processing device is further to analyze one or more components of the software container to determine the thermal characteristic of the software container.

11. The system of claim 10, wherein, to analyze the one or more components of the software container to determine the thermal characteristic of the software container, the processing device is to determine a functionality associated with one or more software components of the software container.

12. The system of claim 10, wherein, to analyze the one or more components of the software container to determine the thermal characteristic of the software container, the processing device is to:
monitor an execution of the software container on second compute node of the plurality of compute nodes; and
determine the thermal characteristic of the software container based on a change in a thermal state of the second compute node during the execution of the software container.

13. The system of claim 8, wherein the processing device is further to analyze one or more components of the software container to determine a thermal affinity associated with the software container, the thermal affinity indicating a prior thermal state of a prior compute node from a prior execution of the software container, and
wherein the processing device is to schedule the software container on the first compute node further based on the thermal affinity associated with the software container.

14. The system of claim 8, wherein, to schedule the software container on the first compute node of the plurality of compute nodes based on the comparison of the thermal state of the first compute node to the defined threshold, the processing device is to schedule the software container on the first compute node responsive to the thermal state of the first compute node being less than a thermal capping temperature of a processor core associated with the first compute node.

15. A non-transitory computer-readable storage medium including instructions that, when executed by a processing device, cause the processing device to:
obtain a software container for execution on one of a plurality of compute nodes; and
schedule the software container on a first compute node of the plurality of compute nodes based on a comparison of a thermal state of the first compute node to a defined threshold, wherein the schedule of the software container on the first compute node is further based on a thermal characteristic of the software container, wherein the thermal characteristics of the software container are based on whether operations within the software container increase a thermal energy of the first compute node, wherein the defined threshold includes a first threshold associated with thermal throttling and a second threshold associated with a lower thermal energy than the first threshold.

16. The non-transitory computer-readable storage medium of claim 15, wherein the processing device is further to analyze one or more components of the software container to determine the thermal characteristic of the software container.

17. The non-transitory computer-readable storage medium of claim 16, wherein, to analyze the one or more components of the software container to determine the thermal characteristic of the software container, the processing device is to determine a functionality associated with one or more software components of the software container.

18. The non-transitory computer-readable storage medium of claim 16, wherein, to analyze the one or more components of the software container to determine the thermal characteristic of the software container, the processing device is to:
monitor an execution of the software container on second compute node of the plurality of compute nodes; and
determine the thermal characteristic of the software container based on a change in a thermal state of the second compute node during the execution of the software container.

19. The non-transitory computer-readable storage medium of claim 15, wherein the processing device is further to analyze one or more components of the software container to determine a thermal affinity associated with the software container, the thermal affinity indicating a prior thermal state of a prior compute node from a prior execution of the software container, and
wherein the processing device is to schedule the software container on the first compute node further based on the thermal affinity associated with the software container.

20. The non-transitory computer-readable storage medium of claim 15, wherein, to schedule the software container on the first compute node of the plurality of compute nodes based on the comparison of the thermal state of the first compute node to the defined threshold, the processing device is to schedule the software container on the first compute node responsive to the thermal state of the first compute node being less than a thermal capping temperature of a processor core associated with the first compute node.

* * * * *